US006930993B1

(12) United States Patent
Hamada et al.

(10) Patent No.: US 6,930,993 B1
(45) Date of Patent: Aug. 16, 2005

(54) TDMA RADIO COMMUNICATION SYSTEM, AND A BASE STATION AND SUBSCRIBER STATIONS FOR RADIO COMMUNICATION

(75) Inventors: Tomokazu Hamada, Tokyo (JP); Youichi Moritani, Tokyo (JP); Takashi Kawabata, Tokyo (JP); Shuji Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/529,440

(22) PCT Filed: Sep. 30, 1998

(86) PCT No.: PCT/JP98/04391

§ 371 (c)(1),
(2), (4) Date: Apr. 13, 2000

(87) PCT Pub. No.: WO00/19755

PCT Pub. Date: Apr. 6, 2000

(51) Int. Cl.[7] ............................................. H04B 7/212
(52) U.S. Cl. ...................... 370/347; 370/337; 455/501; 455/63.1; 455/67.13
(58) Field of Search ................................ 370/328–330, 370/336, 337, 347; 455/500–501, 506, 63.1, 455/67.13, 114.2, 226.1–226.3

(56) References Cited

U.S. PATENT DOCUMENTS 5,778,318 A * 7/1998 Talarmo et al. .......... 455/452.1
5,937,002 A * 8/1999 Andersson et al. ......... 375/131
6,240,125 B1 * 5/2001 Andersson et al. ......... 375/132
6,286,122 B1 * 9/2001 Alanara ....................... 714/781
6,298,081 B1 * 10/2001 Almgren et al. ............ 375/132

FOREIGN PATENT DOCUMENTS

| JP | 64-017525 A | 1/1989 |
|---|---|---|
| JP | 07-184254 A | 7/1995 |
| JP | 09-093645 A | 4/1997 |
| JP | 10-051841 A | 2/1998 |
| JP | 10-079970 A | 3/1998 |
| JP | 10-079997 A | 3/1998 |
| JP | 10-210554 A | 8/1998 |
| JP | 10-233725 A | 9/1998 |

* cited by examiner

Primary Examiner—Chi Pham
Assistant Examiner—Thai Hoang
(74) Attorney, Agent, or Firm—Rothwell, Figg, Ernst & Manbeck

(57) ABSTRACT

In a TDMA communication system in which a base station communicates with a plurality of subscriber stations, communication time slots used in a wireless communication are allocated/arranged while avoiding an occurrence of interference.

In the case that interference (51) occurs in a communication time slot (411) of a line (71) through which the communication is made from a subscriber station (21) to a base station (1), interference information is registered into an interference time slot database (101) of the base station (1). When the communication time slots are reallocated and rearranged, a TDMA control unit of the base station (1) executes the communication time slot reallocation/rearrangement by referring to information registered in the interference time slot database (101), so that the occurrence of interference is avoided.

11 Claims, 11 Drawing Sheets

TDMA RADIO COMMUNICATION SYSTEM, AND A BASE STATION AND SUBSCRIBER STATIONS FOR RADIO COMMUNICATION

TECHNICAL FIELD

The present invention relates to a system for avoiding interference occurred in TDMA wireless communications.

BACKGROUND ART

In a cellular system in which a predetermined area is entirely covered by a plurality of base stations, a preselected number (for example, 7 pieces) of frequencies are repeatedly utilized, so that a two-dimensional service is available.

In such a so-called "POINT TO MULTI-POINT type" communication system (will be referred to as a "P-MP type communication system"), it is required to avoid interference occurred between a service area of an own station and a service area of another station using the same frequency as that of the first-mentioned station.

Generally speaking, in a fixed communication, such a system capable of avoiding interference with another service area by way of antenna directivity of both a base station and a subscriber station is employed. On the other hand, in a mobile communication, there are provided a system in which when a base station is initiated, all of wireless carriers (radio carriers) allocated to the own stations are monitored to determine a use frequency, and also another system in which an occurrence of interference is sensed by measuring a bit error rate and the like of a reception signal, and then an interference packet is retransmitted and also a communication channel is changed.

However, in the system capable of realizing the two-dimensional fixed communication service by the base station installed on the ground, typically known as the P-MP fixed communication system, there is such a limitation that the occurrence of interference is avoided only by way of the antenna directivity due to complex geographical features present within the service area. Also, since the transfer band of the fixed communication system is wider than that of the mobile communication system, it is not preferable to avoid the occurrence of interference by arranging a large number of wireless carriers (like as the mobile communication) in view of effective frequency utilizations. Furthermore, considering storages of exclusively used line services, it is impossible to regularly block the base station so as to detect the occurrence of interference.

Also, as to the system for detecting the occurrence of interference by employing the bit error rate of the reception signal, since the reception side cannot recognize the presence of the channel addressed to the own station before receiving this channel in the TDM line, even if interference happens to occur, the reception side cannot detect the occurrence of this interference.

In a TDMA type wireless communication system for executing a reallocation control and a rearrangement control, reliability of a control line through which a base station communicates with a subscriber station so as to execute the above-explained controls may adversely influence performance of the entire wireless communication system. In the reallocation control, a total number of allocation time slots are changed during communication in response to a change in a traffic. In the rearrangement control, time slot arrangements are changed. As a consequence, the error correction capability of the control line is emphasized, and also the same data is transferred by using the plural frames. However, in the fixed communication system, since the interference occurs in a fixed and periodical manner, the above-explained measures cannot become effective.

Moreover, in such a communication system that the bit error rate of the reception signal is measured so as to sense the occurrence of interference, and then the interference packet is retransmitted and/or the communication channel is changed, there is a certain possibility that the occurrence of such interference is erroneously detected due to adverse influences caused by variations in space propagation losses and also spike-like noise such as shadowing and a thunderbolt. When such interference erroneous detections occur many times, there is such a problem that since the interference is unnecessarily avoided and also the data resend control is carried out, the line storage capabilities would be reduced.

The present invention has been made to solve such a problem, and therefore, has an object to provide a TDMA communication system, a base station apparatus for executing TDMA communication, and a subscriber station apparatus, capable of reallocating/rearranging communication time slots among a base station and subscriber stations, while avoiding an occurrence of interference.

DISCLOSURE OF THE INVENTION

The present invention is directed to such a base station apparatus for communicating with a plurality of subscriber stations in a TDMA wireless communication manner, comprising: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, wherein when interference is detected in a predetermined time slot received from a subscriber station, the interference time slot information is registered into the interference time slot database, and blocking information of an interference time slot is transmitted to the subscriber station; the time slot reallocation/rearrangement are carried out based upon registered information of the interference time slot database; and also time slot reallocation/rearrangement information is transmitted to the respective subscriber stations. As a result, the interference which cannot be avoided by directivity of an antenna can be avoided, so that setting conditions of the base station can be largely mitigated.

Also, the present invention is directed to such a TDMA wireless communication system in which a base station communicates with a plurality of subscriber stations in a wireless manner, wherein the base station comprises: an interference time slot database for registering/storing thereinto a communication time slot in which interference happens to occur; and a TDMA control unit for executing reallocation rearrangement of time slots communicating with the respective subscriber stations in response to a change in a traffic based upon the interference time slot information of the interference time slot database, wherein when interference is detected in a predetermined time slot received from the base station, the subscriber station transmits interference time slot information to the base station, and wherein the base station which has received the interference time slot information registers the interference time slot information into the interference time slot database, performs the time slot reallocation/rearrangement based upon registered information of the interference time slot database, and also transmits time slot reallocation/rearrangement information to the respective subscriber stations. As a result, it is possible to avoid the occurrence of interference which cannot be avoided by directivity of an antenna.

Also, the present invention is directed to such a TDMA wireless communication system in which a base station wireless-communicates with a plurality of subscriber stations by an up-stream line TDMA system and a down-stream line TDM system, wherein the base station comprises: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, and also transmits up-stream TDMA time slot reallocation/rearrangement information to the respective subscriber stations every predetermined frame in a down-stream TDM line, wherein each of the subscriber stations monitors as to whether or not there is the up-stream TDMA time slot reallocation/rearrangement information addressed to the own subscriber station, which is transmitted from the base station every predetermined frame, and when the up-stream TDMA time slot reallocation/rearrangement information cannot be received, the subscriber station judges an occurrence of interference and transmits the occurrence of interference to the base station, and wherein the base station which has received the occurrence of interference registers the interference occurrence information into the interference time slot database, and transmits time slot reallocation/rearrangement information to the respective subscriber stations based on the registered information saved in the interference time slot database. As a result, a monitor circuit used to detect the interference of the TDM line is not especially provided, but the occurrence of interference can be readily detected.

Also, the present invention is directed to such a TDMA wireless communication system in which a base station communicates with a plurality of subscriber stations in a wireless manner, wherein time slot allocations/arrangements of the respective subscriber stations are changed all at once every super frame of a TDMA frame, and wherein a base station transmits to the respective subscriber stations, subsequent time slot reallocation/rearrangement information with different time slot arrangements in a plurality of frames within a super frame period. Accordingly, the time slot reallocation/rearrangement information can be firmly transmitted without receiving the adverse influence caused by the interference.

Also, the present invention is directed to such a base station apparatus in which while a service area of the own base station is subdivided into a plurality of sectors, the base station communicates with a plurality of subscriber stations in a TDMA wireless communication manner, comprising: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, wherein when the time slot reallocation/rearrangement are carried out, the TDMA control unit reallocates/rearranges the time slots in this order of a subscriber station of such a sector where no interference happens to occur, and thereafter, another subscriber station where interference does not occur among sectors where the interference occurs. Accordingly, probability where the interference happens to occur after the reallocation/rearrangement can be reduced.

Also, in accordance with the present invention, since the interference time slot database manages the interference time slot information every sector, probability where the interference happens to occur after the reallocation/rearrangement can be reduced.

Also, the present invention is directed to such a base station apparatus for communicating with a plurality of subscriber stations in a TDMA wireless communication manner, comprising: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, wherein when interference is detected in a predetermined time slot received from a subscriber station, the interference time slot information is registered into the interference time slot database, and blocking information of an interference time slot is transmitted to the subscriber station; the time slot reallocation/rearrangement are carried out based upon registered information of the interference time slot database; and also time slot reallocation/rearrangement information is transmitted to the respective subscriber stations, and wherein on the other hand, in the case that the interference time slot is received for a predetermined time period and the interference disappears, the interference time slot information registered into the interference time slot database is deleted therefrom. As a consequence, the interference which cannot be avoided by directivity of the antenna can be avoided, and furthermore, such a time slot where the interference disappears can be effectively utilized in the reallocation/rearrangement.

Also, the present invention is featured by that the base station apparatus comprises an interference erroneous detection database, and registers the interference time slot information which has been deleted from the interference time slot database into the interference erroneous detection database. Therefore, such a time slot where the interference disappears can be effectively utilized in the reallocation/rearrangement.

Also, the present invention is featured by that when the same interference time slot information whose total number is larger than, or equal to a preselected number is registered into the interference erroneous detection database within a predetermined time period, the base station apparatus transmits an abnormal state to a central station for managing the base station. As a result, it is possible to detect malfunction of the base station apparatus and an occurrence of an unexpected failure at an earlier stage, and also the base station apparatus can solve such a problem.

Also, the present invention is featured by that when the same interference time slot information whose total number is larger than, or equal to a preselected number is registered into the interference erroneous detection database within a predetermined time period, the base station apparatus increases an interference judging threshold value used to detect an occurrence of interference. As a consequence, it is possible to avoid the erroneous detection which is caused by the temporary deterioration in the communication quality, and also possible to prevent the line storage capability from being lowered.

Also, the present invention is directed to such a TDMA wireless communication system in which a base station communicates with a plurality of subscriber stations in a wireless manner, wherein the base station comprises: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, wherein when interference is detected in a predetermined time slot received from the base station, the subscriber station transmits interference time slot information to the base station, wherein the base station which has received the interference time slot information registers said interference time slot information into the interference time slot database, performs the time slot reallocation/rearrangement based upon registered information of the interference time slot database, transmits time slot reallocation/rearrangement information to the respective subscriber stations, and on the other hand, transmits an instruction signal to the subscriber station, the instruction signal causing the subscriber station to receive the interference time slot for a predetermined time period, and wherein the subscriber station which has received the instruction signal receives the interference time slot for a predetermined time period, and when the interference disappears, the subscriber station sends a request to said base station, the request requesting a deletion of the interference time slot information registered into the interference time slot data. As a consequence, the interference which cannot be avoided by directivity of the antenna can be avoided, and furthermore, such a time slot where the interference disappears can be effectively utilized in the reallocation/rearrangement.

Also, the present invention is featured by that an interference erroneous detection database is provided on the side of either the base station or the subscriber station, and the interference time slot information deleted from the interference time slot database is registered into the interference erroneous detection database. As a result, such a time slot where the interference disappears can be effectively utilized in the reallocation/rearrangement.

Also, the present invention is featured by that when the same interference time slot information whose total number is larger than, or equal to a preselected number is registered into the interference erroneous detection database within a predetermined time period, an abnormal state is transmitted to a central station for managing the base station. As a result, it is possible to detect malfunction of the base station apparatus and an occurrence of an unexpected failure at an earlier stage, and also the base station apparatus can solve such a problem.

Also, the present invention is featured by that when the same interference time slot information whose total number is larger than, or equal to a preselected number is registered into the interference erroneous detection database within a predetermined time period, an interference judging threshold value used to detect interference is increased. As a consequence, it is possible to avoid the erroneous detection which is caused by the temporary deterioration in the communication quality, and also possible to prevent the line storage capability from being lowered.

Also, the present invention is directed to such a subscriber station apparatus for communicating with a base station in a TDMA wireless communication manner, wherein when interference is detected in a predetermined time slot received from the base station, the subscriber station apparatus transmits interference time slot information to the base station, and when the subscriber station receives the interference time slot for a predetermined time period and the interference disappears, the subscriber station transmits interference disappear information to the base station. As a consequence, the interference can be avoided, and furthermore, such a time slot where the interference disappears can be effectively utilized in the reallocation/rearrangement.

BEST MODE FOR CARRYING OUT THE INVENTION

For a more detailed description of the present invention, best modes for carrying out the present invention will now be explained with reference to the accompanying drawings.

EMBODIMENT MODE 1

Figure 1:
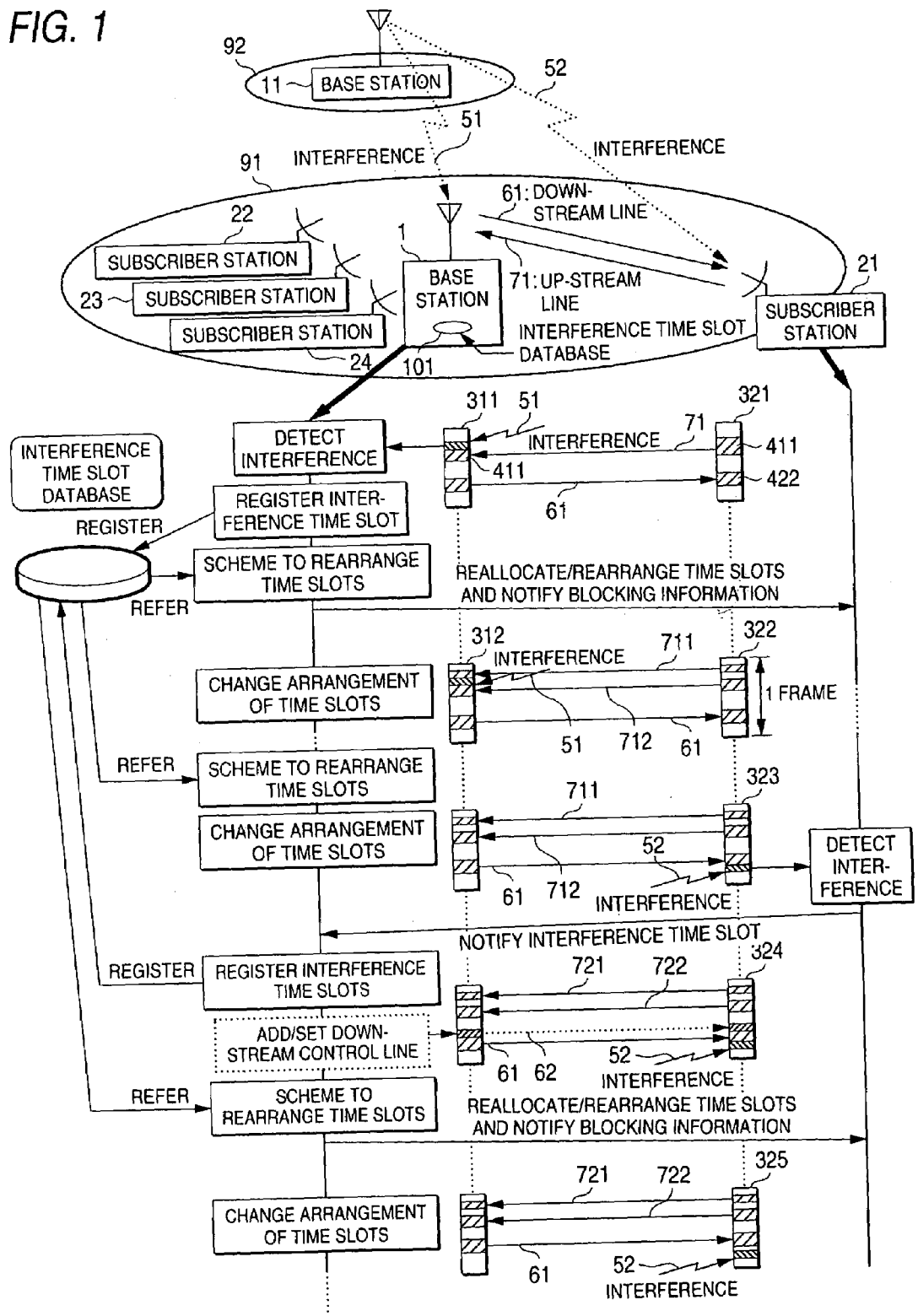
FIG. 1 is a diagram showing a TDMA wireless communication system according to an embodiment mode 1 of the present invention.

FIG. 1 is a diagram showing an embodiment mode 1 according to the present invention.

In FIG. 1, it is now assumed that a base station 1 executes a communication by way of the TDMA/TDD system among subscriber stations 21 to 24 within the own service area 91. Reference numeral 61 indicates a down-stream line through which the TDMA/TDD system communication is carried out between this base station 1 and the subscriber station 21, and reference numeral 71 indicates an up-stream line through which the same communication is performed between them. In the up-stream line as well as the down-stream line connected between the base station 1 and the respective subscriber stations 21 to 24, a TDMA control unit of the base station 1 performs both a reallocation control and a rearrangement control, and may realize such a communication that a frame use efficiency becomes optimum among the base station 1 and the respective subscriber stations 21 to 24 in response to present conditions. While the reallocation control is carried out, a total number of allocation time slots to each traffic is regularly changed in response to a change in traffics when a call is made. While the rearrangement control is performed, the time slot arrangement is changed in response to a change in traffics.

Assuming now that a base station 113 installed at a position separated by a preselected distance from the base station 1 communicates with a subscriber station located within the own station service area 92 by using the same frequency as that of the base station 1, the electromagnetic wave transmitted from this base station 11 gives interference as an interference wave 51 to the communication established between the base station 1 and the subscriber station 21 via the up-stream line 71. As a result, as shown in the drawing, as to a TDMA frame 311 of the base station 1, a portion of a time slot 411 cannot be received by this interference wave 51. This time slot 411 is allocated to the up-stream line 71 between the base station 1 and the subscriber station 21.

The base station 1 compares a bit error rate of a reception signal and a reception electric field strength with an interference judging threshold value so as to detect this occurrence, and then registers interference time slot information to an interference time slot database 101.

The TDMA control unit of the base station 1 makes a plan of time slot reallocation based upon communication request information issued from the subscriber stations 21 to 24 within a predetermined frame period, and at the same time, makes a plan of such a time slot rearrangement based upon the allocation time slot number (quantity) of each line and also interference time slot information registered in the interference time slot database 101. In this time slot rearrangement, the frame use efficiency can become optimum without using the interference time slot.

After the time slot information which has been reallocated/rearranged by the TDMA control unit is notified to the respective subscriber stations 21 to 24 by employing the down-stream line 61 within a time period up to one frame preceding to a TDMA frame 312, a communication is commenced from the TDMA frame 312 by a new time slot arrangement. In other words, the TDMA frame 312 corresponds to change timing for a predetermined time slot reallocation and a predetermined time slot rearrangement irrespective of such a fact as to whether or not interference occurs, and the TDMA control unit may realize preventing of the interference time slot by referring to the interference time slot database 101 in conjunction with the execution of the normal time slot reallocation/rearrangement.

At this time, in order to avoid the interference time slot 51, the up-stream line 71 which receives the interference is subdivided into two sets of up-stream lines 711 and 712 to be arranged. As a result, the adverse influence caused by the interference wave 51 from the base station 11 can be avoided. Alternatively, it should be noted that the up-stream lines 711 and 712 may be rearranged to other time slots, while these up-stream lines are not always subdivided into a plurality of lines.

On the other hand, in the case that a portion of a time slot 422 allocated to a down-stream line 61 between the base station 1 and the subscriber station 21 cannot be received by another interference wave 52 sent from the base station 11 in a TDMA frame 323 of the subscriber station 21, the subscriber station 21 detects an occurrence of interference based upon a bit error rate of a reception signal and a reception electric field strength, and then notifies this interference time slot 422 via the up-stream line 71 to the base station 1.

The base station 1 which has received the notification of the occurrence of interference from the subscriber station 21 registers interference time slot information to the interference time slot database 101.

Similar to the above-explained control case of the up-stream line, the TDMA control unit of the base station 1 schemes the time slot reallocation/rearrangement capable of avoiding this interference time slot with reference to the interference time slot database 101, and then notifies the schemed time slot reallocation/rearrangement to the respective subscriber stations 21 to 24. Thus, since the communication is commenced by the TDMA frame 325 with a new time slot arrangement, the adverse influence caused by the interference wave 52 from the base station 11 can be avoided.

In this case, the information about the time slot reallocation/rearrangement is notified to the respective subscriber stations 21 to 24 by using the down-stream line 61 in a time period up to one frame preceding to the TDMA frame 325. However, since the reliability of this down-stream line 61 is lowered due to the adverse influence caused by the interference wave 52, the base station 1 may newly set another down-stream line 62 which is exclusively used to transfer the information about the time slot reallocation/rearrangement with respect to the subscriber station 21.

In this case, the base station 1 may set a new line by employing a broadcasting channel, and also may previously set an auxiliary time slot between the base station 1 and the subscriber stations 21 to 24 in order to prepare for an occurrence of interference. Also, when the TDMA system is employed in the down-stream line, a specific communication for setting the line is no longer required.

EMBODIMENT MODE 2

Figure 2:
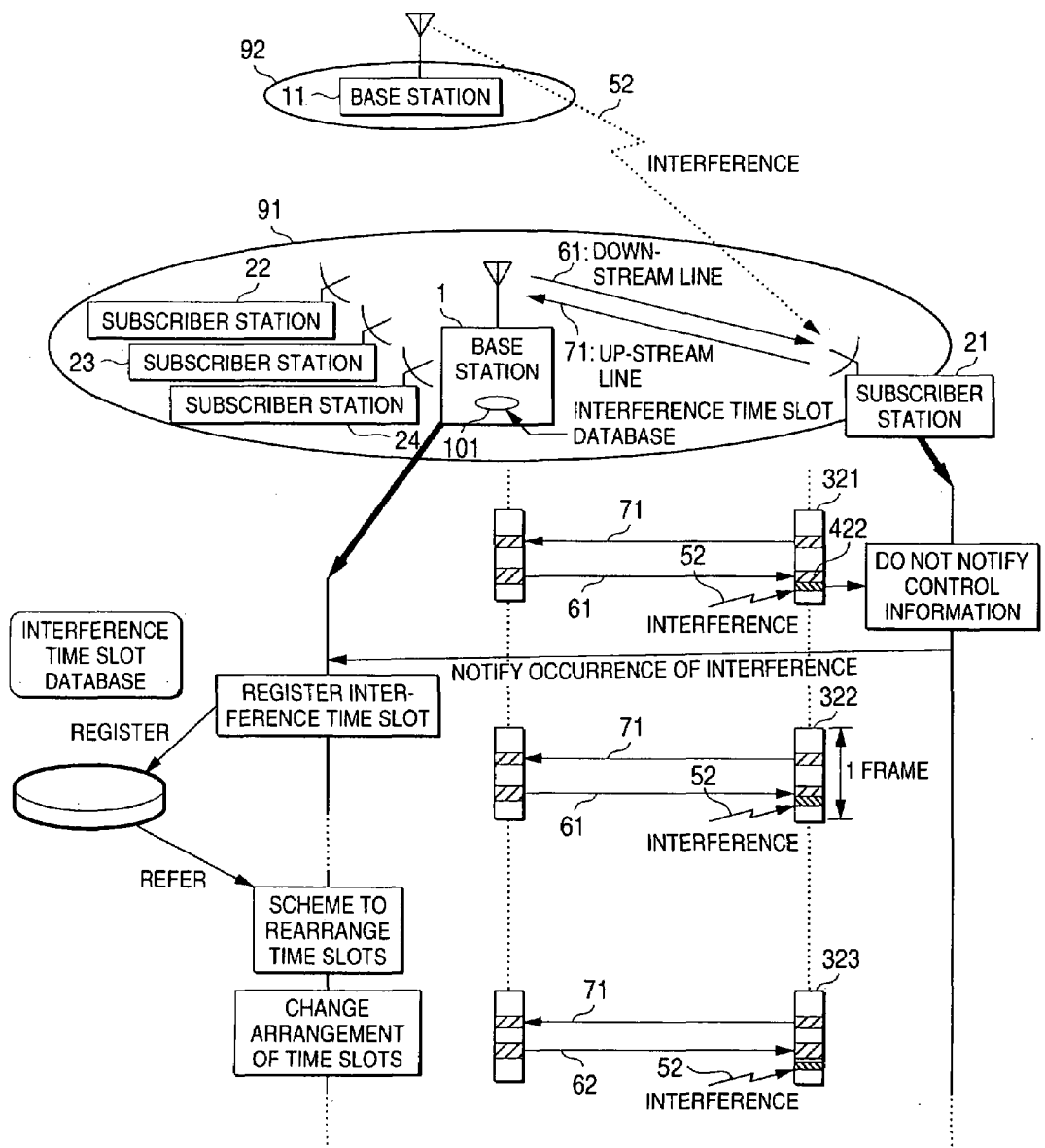
FIG. 2 is a diagram showing a TDMA wireless communication system according to an embodiment mode 2 of the present invention.

FIG. 2 is a diagram showing an embodiment mode 2 according to the present invention.

In FIG. 2, it is now assumed that a base station 1 executes a communication by way of the TDMA system for the up-stream and the TDM system for the down-stream among subscriber stations 21 to 24 within the own service area 91. Reference numeral 61 indicates a down-stream line through which the communication is carried out between this base station 1 and the subscriber station 21, and reference numeral 71 indicates an up-stream line through which the same communication is performed between them. In the up-stream line as well as the down-stream line connected between the base station 1 and the respective subscriber stations 21 to 24, a TDMA control unit of the base station 1 performs both a reallocation control and a rearrangement control, and may realize such a communication that a frame use efficiency becomes optimum among the base station 1 and the respective subscriber stations 21 to 24 in response to present conditions. While the reallocation control is carried out, a total number of allocation time slots to each traffic is regularly changed in response to a change in traffics when a call is made. While the rearrangement control is performed, the time slot arrangement is changed in response to a change in traffics.

Figure 3:
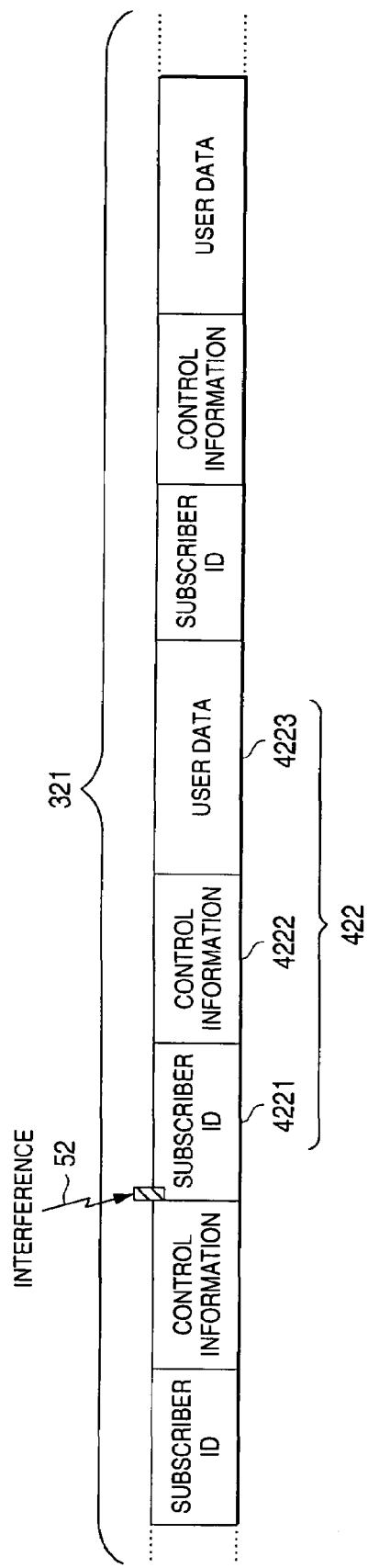
FIG. 3 is a diagram showing a frame structure used in the TDMA wireless communication system according to the embodiment mode 2 of the present invention.

FIG. 3 is a diagram showing a structure of a TDM down-steam line according to this embodiment mode. The communication required between the base station 1 and the subscriber stations 21 to 24 so as to control the time slot reallocation and the time slot rearrangement is carried out by employing a portion of the TDM channels allocated to each of the subscribers 21 to 24. In FIG. 3, reference numeral 422 indicates a TDMA channel of the subscriber station 21. This TDMA channel is arranged by a subscriber ID 4221, control information 4222, and also user data 4223.

In accordance with the TDM system, since the respective subscriber stations 21 to 24 cannot recognize in advance whether or not information addressed to the own subscriber station is transmitted via which channel, the respective subscriber stations 21 to 24 sense the subscriber ID of the own subscriber station every frame so as to find out the channel addressed to the own subscriber station, so that the information addressed to the own subscriber station is received. Then, in the TDMA/TDM system according to this embodiment mode, reallocation/rearrangement information of an up-stream TDMA time slot of each of the subscriber stations 21 to 24 is transmitted as a portion of the respective user data to each of down-stream TDM frames.

Assuming now that a base station 11 installed at a position separated by a preselected distance from the base station 1 communicates with a subscriber station located within the own station service area 92 by using the same frequency as that of the base station 1, the electromagnetic wave transmitted from this base station 11 gives interference as an interference wave 52 to the communication established between the base station 1 and the subscriber station 21 via the down-stream line 61. As a result, as shown in FIG. 2 and FIG. 3, as to a down-stream TDM channel 422 established between the base station 1 and the subscriber station 21, a portion of a time slot cannot be received by this interference wave 52. As a consequence, the subscriber station 21 cannot recognize the TDM channel 422 addressed to the own subscriber station in this TDM frame 321.

As a consequence, since the subscriber station 21 cannot receive the information about the up-stream TDMA time slot reallocation/rearrangement in the TDM frame 321, this subscriber station 21 recognizes that interference happens to occur, and then notifies this fact to the base station 1 via the up-stream line 71. The information about the up-stream TDMA time slot reallocation/rearrangement should be notified every frame.

The base station 1 which has received the notification about the occurrence of interference from the subscriber station 21 registers interference time slot information related to the relevant TDM channel into the interference time slot database 101. The TDMA control unit of the base station 1 makes a plan of time slot reallocation based upon communication request information issued from the subscriber stations 21 to 24 within a predetermined frame period, and at the same time, makes a plan of such a time slot rearrangement based upon the allocation time slot number (quantity) of each line and also interference time slot information registered in the interference time slot database 101. In this time slot rearrangement, the frame use efficiency can become optimum. As a result, since the communication is commenced via a TDM frame 323 by a new time slot arrangement without using the interference time slot, the adverse influence caused by the interference wave 52 from the base station 11 can be avoided.

In this case, the information about the time slot reallocation/rearrangement is notified to the respective subscriber stations 21 to 24 by using the down-stream line 61 in a time period up to one frame preceding to the TDMA frame 323. Since the reliability of this down-stream line 61 is lowered due to the adverse influence caused by the interference wave 52, the base station 1 may newly set another down-stream line 62 which is exclusively used to transfer the information about the time slot reallocation/rearrangement with respect to the subscriber station 21. However, since the TDM system is employed in the down-stream line in this embodiment mode, a specific communication for setting the line is no longer required.

EMBODIMENT MODE 3

Figure 4:
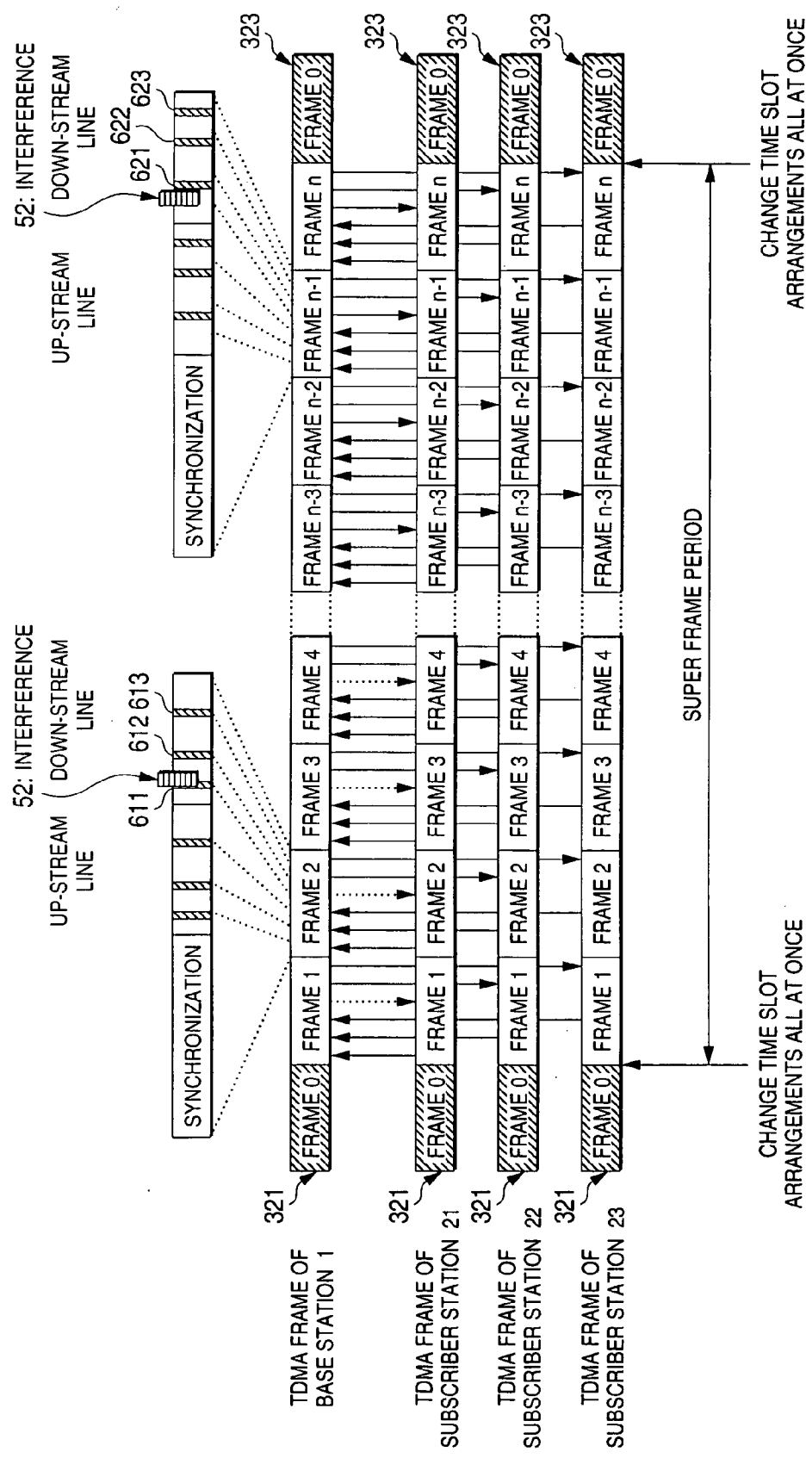
FIG. 4 is a diagram showing a frame structure used in a TDMA wireless communication system according to an embodiment mode 3 of the present invention.

FIG. 4 is a diagram showing an embodiment mode 3 according to the present invention. In this embodiment mode, information about time slot reallocation/rearrangement derived from the base station 1 is notified to the respective subscriber stations by using down-stream lines 611 to 613 and also down-stream lines 621 to 623, the time slot arrangements of which are different from each other in a plurality of frames of such a time period defined from a TDMA frame 321 up to one frame preceding to another TDMA frame. The TDMA frame 321 is such a frame immediately after time slot arrangements are changed all at once. In the TDMA frame 323, next time slot arrangements are changed all at once.

Now, in such a case that an interference wave 52 produced from another service area is present in the time slot 611 of the down-stream line with respect to the subscriber station 21, the time slot reallocation/rearrangement information with respect to the subscriber station 21 is brought into non-delivery state. However, in a rear-half frame, since this time slot reallocation/rearrangement information is transmitted via the time slot 621 of the down-stream line with respect to the subscriber station 21, the information can be firmly notified until such timing when the time slot arrangements are changed all at once.

The switching timing at which the combination of the down-stream lines is switched from 611–613 to 621–623 may be previously determined between the base station 1 and the subscriber stations 21 to 24. Alternatively, this switching timing may be notified by the base station to the respective subscriber station 21 to 24 by using broadcasting channels of the respective frames. Also, when the TDM system is employed in the down-stream line, the base station may allocate an arbitrary time slot arrangement.

EMBODIMENT MODE 4

Figure 5:
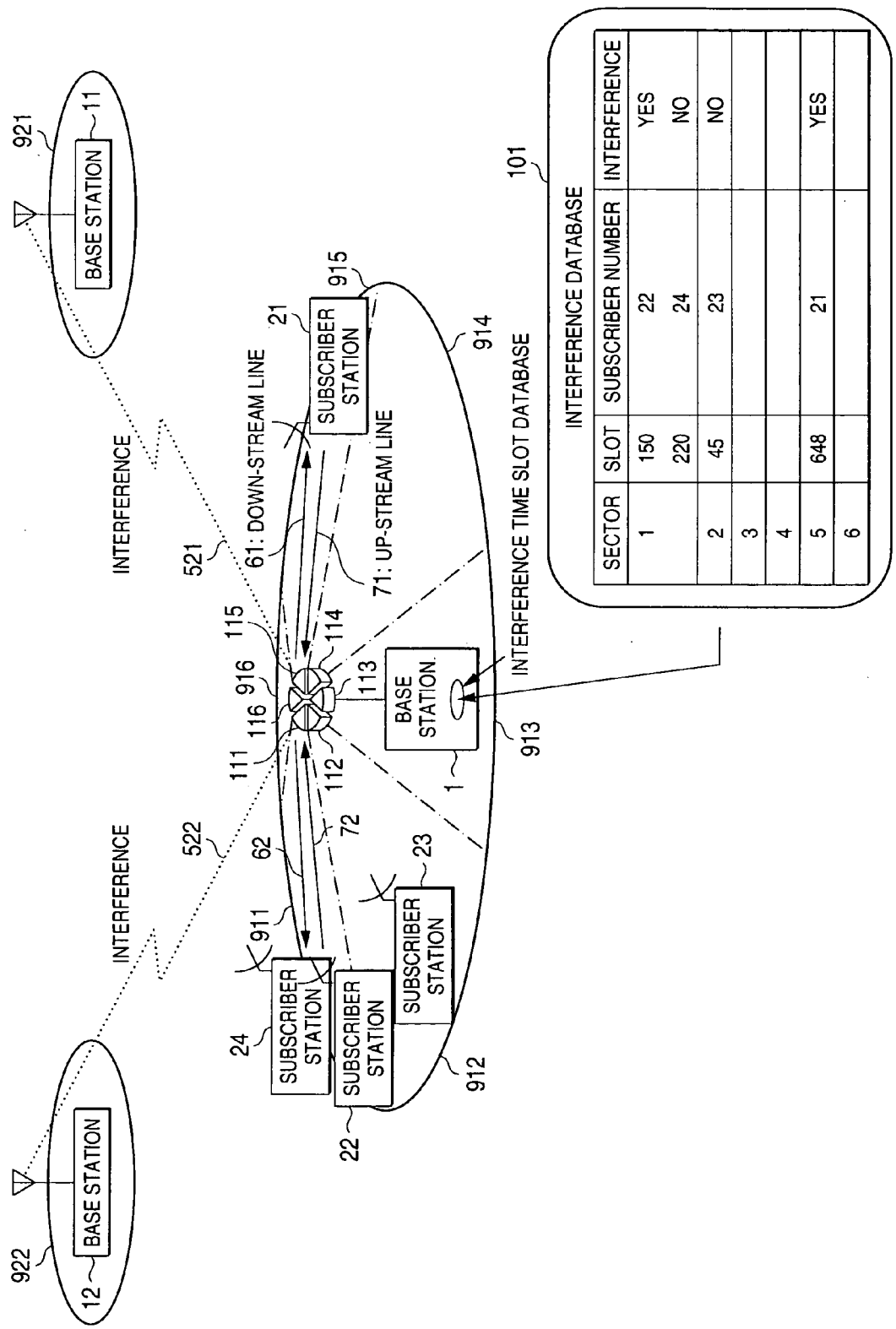
FIG. 5 is a diagram showing a TDMA wireless communication system according to an embodiment mode 4 of the present invention.

FIG. 5 is a diagram showing an embodiment mode 4 according to the present invention. In this embodiment mode, the base station 1 communicates with the subscriber stations 21 to 24 while a service area of the own base station 1 is subdivided into a plurality of sectors 911 to 916, and directivity antennas 111 to 116 for covering the respective sectors 911 to 916 are switched in a time divisional manner.

It is now assumed that the base station 1 communicates with the respective subscriber stations 21 to 24, and both an up-stream line 71 of the subscriber station 21 and an up-stream line 72 of the subscriber station 22 are adversely influenced by interfere caused by electromagnetic waves 521 and 522 from base stations 11 and 12 of other service areas 921 and 922. As shown in FIG. 5, the interference time slot database 101 of the base station 1 manages the interference time slots every antenna sector and every subscriber station. In the case that the base station 1 performs the time slot reallocation/rearrangement with respect to the respective subscriber stations 21 to 24, this base station 1 allocates the time slots to firstly such a sector where no interference occurs and secondly such a subscriber station of the same sector, where no interference occurs in this order with having a priority order. As a consequence, probability when the interference again occurs can be reduced.

EMBODIMENT MODE 5

Figure 6:
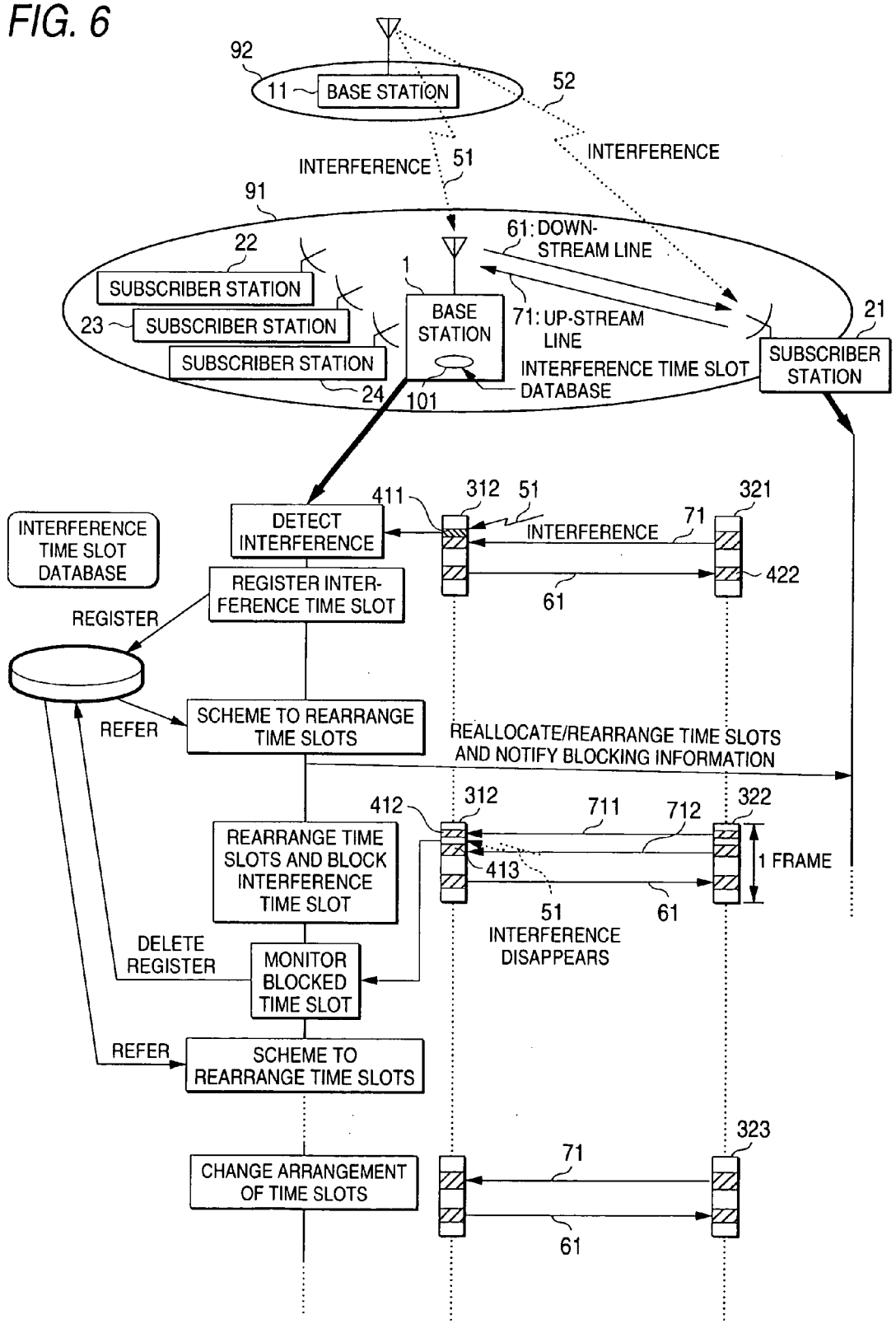
FIG. 6 is a diagram showing a TDMA wireless communication system according to an embodiment mode 5 of the present invention.

FIG. 6 is a diagram showing an embodiment mode 5 according to the present invention.

In this figure, it is now assumed that an electromagnetic wave transmitted from base station 1 gives interference as an interference wave 51 to such a time slot 411 which is allocated to an up-stream line 71 between the base station 1 and the subscriber station 21. The base station 1 communicates with the subscriber station 21 in such a manner that the base station 1 detects the interference and registers this time slot 411 into the interference time slot database 101 so as to block this time slot 411 and also to rearrange the up-stream line 71 to time slots 412 and 413. On the other hand, the base station 1 receives the blocked time slot 411 during a predetermined time period so as to detect as to whether or not an interference wave given to this time slot 411 is present.

When the interference wave of the interference time slot 411 cannot be detected, and furthermore, when the interference which has been once detected disappears later, the base station 1 releases the blocked time slot by deleting the registered time slot 411 from the interference time slot database 101. As a result, under the time slot reallocation/rearrangement control after releasing the blocked time slot, this relevant time slot 411 can be again allocated to the up-stream line 71. It should also be noted that this time slot 411 may be allocated to any line other than the up-stream line 71 in the time slot reallocation.

EMBODIMENT MODE 6

Figure 7:
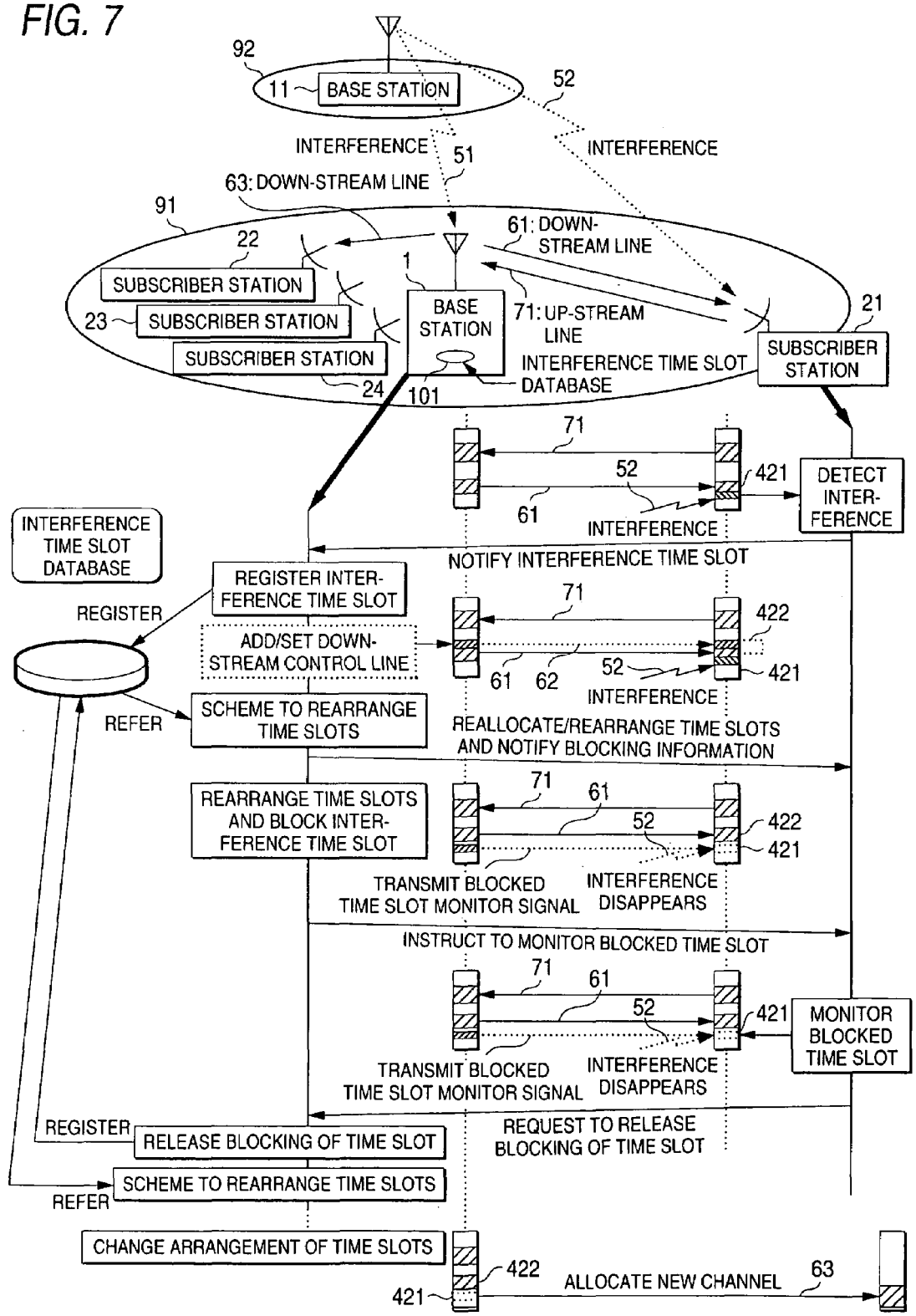
FIG. 7 is a diagram showing a TDMA wireless communication system according to an embodiment mode 6 of the present invention.

FIG. 7 is a diagram showing an embodiment mode 6 according to the present invention.

In this figure, it is now assumed that a portion of a time slot 421 allocated to a down-stream line 61 cannot be received in a communication established between the base station 1 and the subscriber station 21 due to an interference wave 52 transmitted from the base station 11.

To detect the interference wave 52 occurred in the time slot 421 allocated to the down-stream line 61, the subscriber station 21 notifies via an up-stream line 71 to the base station 1, such a fact that the interference is detected from this relevant time slot 421. The TDMA control unit of the base station 1 registers this time slot 421 into the interference time slot database 101 to thereby block this time slot 421, and then schemes to rearrange the down-stream line 61 to the time slot 422.

The base station 1 notifies the time slot reallocation/rearrangement via the down-stream line 61 to the subscriber station 21, and also receives the blocked time slot 421 for a predetermined time duration. Then, the base station 1 notifies to the subscriber station 21, such an instruction for detecting as to whether or not an interference wave given to this time slot 421 is present. At this time, as previously explained, with reference to the preceding embodiment modes, the above-mentioned notification may be transferred by employing a control line 62 in order to secure reliability of the down-stream line.

After the interference time slot 421 has been blocked, the subscriber station 21 monitors a monitor signal transmitted from the base station 1 by this time slot 421. In the case that no interference wave cannot be detected and also the interference wave which has once detected disappears later, this subscriber station 21 requests the base station 1 via the up-stream line 71 to release the blocked time slot. The base station 1 which receives the request to release the blocked time slot releases blocking of this time slot by deleting the registered time slot 421 from the interference time slot database 101. As a result, under time slot reallocation/rearrangement executed after releasing of the blocked time slot, this time slot 421 may be allocated to a down-stream line 63 connected to another subscriber station 22. It should also be noted that the time slot 421 may be alternatively allocated to the original down-stream line 61 in the time slot reallocation.

EMBODIMENT MODE 7

Figure 8:
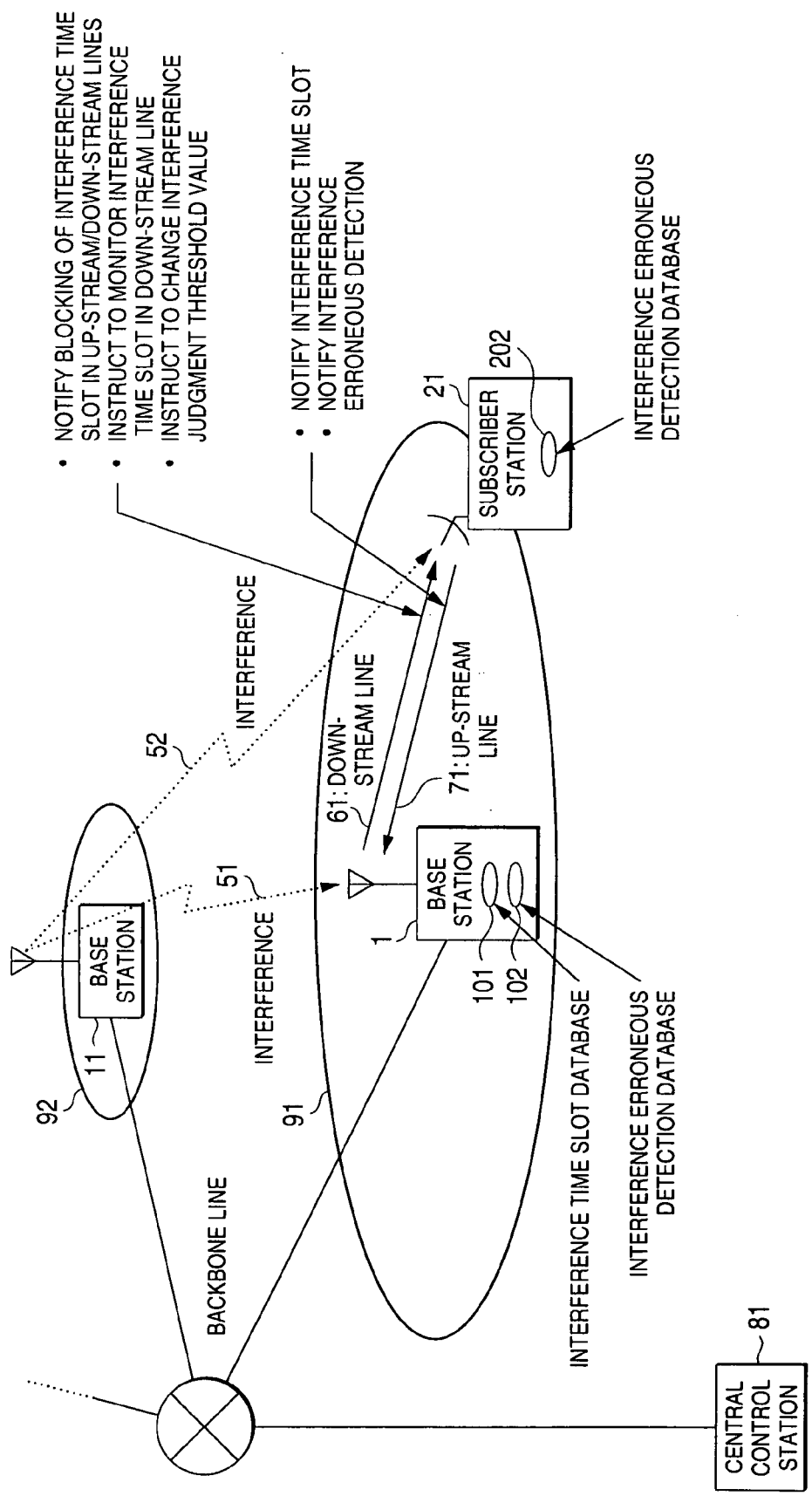
FIG. 8 is a diagram showing a TDMA wireless communication system according to an embodiment mode 7 of the present invention.

FIG. 8 is a diagram showing an embodiment mode 7 according to the present invention.

In this figure, the base station 1 contains an interference time slot database 101 and an interference erroneous detection database 102. The base station 1 registers interference time slot information into the interference time slot database 101. This interference time slot information is detected by the base station 1 and the subscriber station 21 within the service area 91 of the own base station 1. When the base station 1 reallocates and rearranges the time slots with respect to the respective lines, this base station excludes the relevant interference time slot from the time slots to be allocated and blocks the excluded interference time slot.

First, in the case that the base station 1 detects interference, the base station 1 monitors such a time slot that the own base station 1 detects the interference and blocks the interference time slot for a predetermined time period so as to detect as to whether or not an interference wave is present. In the case that either the interference wave cannot be detected or the interference wave which has been once detected disappears later, the base station 1 deletes the information of this relevant time slot from the interference time slot database 101 so as to release blocking of this time slot. At the same time, the base station 1 registers the information of this time slot into the interference erroneous detection database 102.

Next, in the case that the subscriber station 21 detects an occurrence of interference, the base station 1 causes this subscriber station 21 to monitor such a blocked time slot for a predetermined time period in order to detect as to whether or not the interference wave is present. This blocked time slot is produced by such a result that this subscriber station 21 detects the interference. In such a case that either the interference wave cannot be detected or the interference wave which has been once detected disappears later, the subscriber station 21 registers the information of this relevant time slot into an interference erroneous detection database 202 of the own subscriber station 21. At the same time, this subscriber station 21 notifies such a fact that the interference wave cannot be detected to the base station 1. When the base station 1 receives such a notification that no interference wave can be detected from the subscriber station 21, this base station 1 deletes the information about this interference time slot from the interference time slot database 101, and then releases blocking of this interference time slot.

It should be noted that in this embodiment mode, the interference erroneous detection database is also provided in the side of the subscriber station 21. Alternatively, the information about the interference erroneous detection in the subscriber station 21 may be also registered into the interference erroneous detection database 102 provided on the side of the base station 1 and may be managed in a batch mode.

While the base station 1 regularly monitors the information saved in the interference erroneous detection database 102, in the case that a total number of interference erroneous detections every predetermined time period exceeds a reference value, the base station 1 notifies this fact to a central control station 81 via a backbone line 8. In the case that the subscriber station 21 owns the interference erroneous detection database 202, while the subscriber station 21 monitors the information saved in the interference erroneous detection database 202, in the case that a total number of interference erroneous detections in the own subscriber station every predetermined time period is reached to a reference value or more, the subscriber station 21 notifies deterioration in the interference erroneous detection rate to the base station 1. The base station 1 which has received the notification about the deterioration in the interference erroneous detection rate from the subscriber station 21 notifies this fact to the central control station 81 via the backbone line 8. As a result, it is possible to discover the occurrences of the malfunction and failure in the apparatus at an earlier stage.

EMBODIMENT MODE 8

Figure 9:
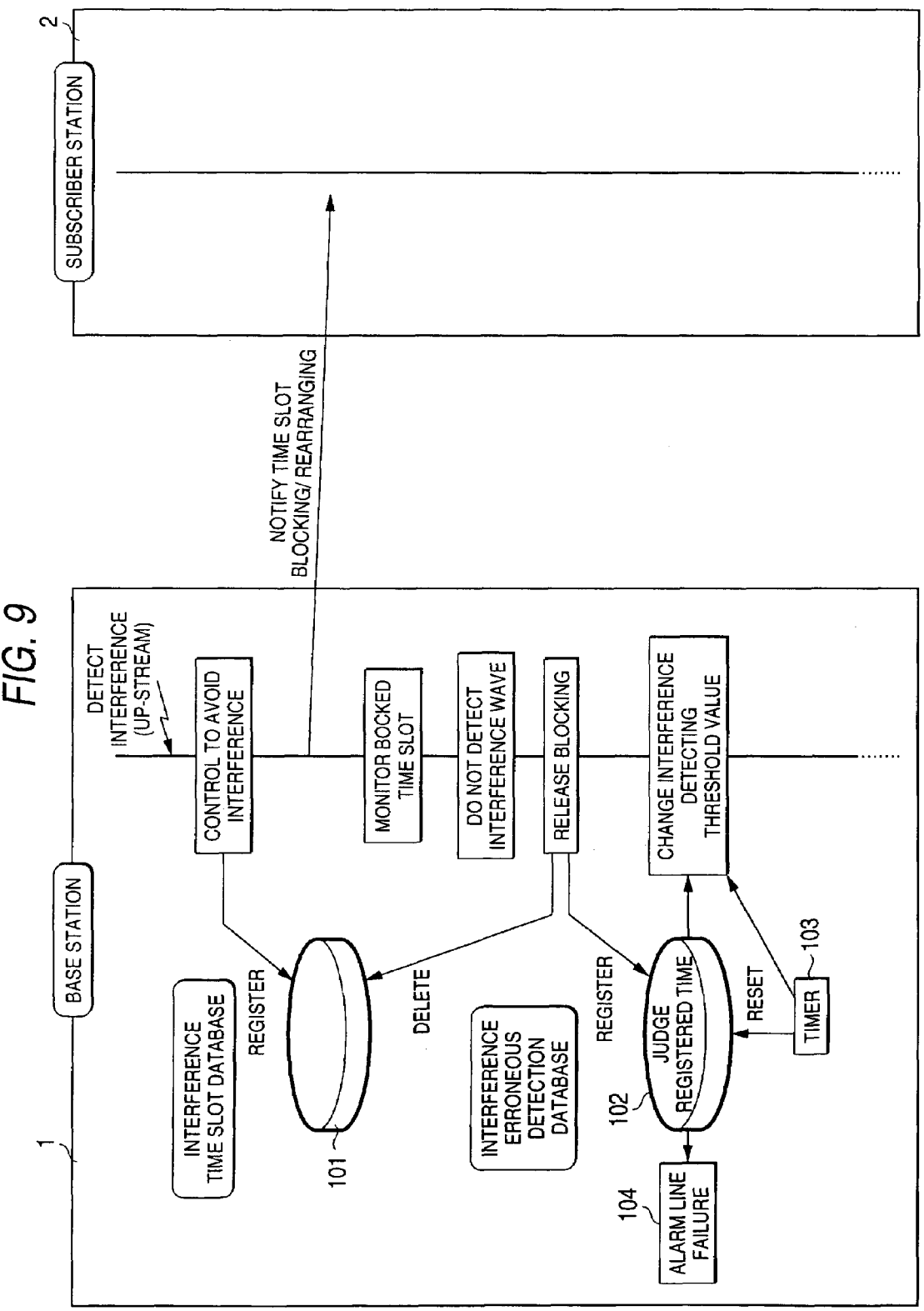
FIG. 9 is a diagram showing a TDMA wireless communication system according to an embodiment mode 8 of the present invention.

FIG. 9 is a diagram showing an embodiment mode 8 according to the present invention.

In this figure, the base station 1 contains an interference time slot database 101 and an interference erroneous detection database 102. The base station 1 registers interference time slot information into the interference time slot database 101. This interference time slot information is detected by the base station 1. When the base station 1 reallocates and rearranges the time slots with respect to the respective lines, this base station excludes the relevant interference time slot from the time slots to be allocated and blocks the excluded interference time slot.

Subsequently, the base station 1 monitors such a time slot that the own base station 1 detects the interference to block the time slot so as to detect as to whether or not an interference wave is present. In the case that either the interference wave cannot be detected or the interference wave which has been once detected disappears later, the base station 1 deletes the information of this relevant time slot from the interference time slot database 101 so as to release blocking of this time slot. At the same time, the base station 1 registers the information of this time slot into the interference erroneous detection database 102.

The information saved in the interference erroneous detection database 102 of the base station 1 is used to judge the erroneous detection time and then is reset every time a time period managed by a timer 103 has passed. In such a case that the base station 1 judges that the erroneous detection time exceeds a reference value, this base station 1 is operated in such a manner that interference erroneous detection probability is lowered by increasing a threshold value of an interference detecting means provided in the own base station. Even when the threshold value is increased up to an upper limit value, if the erroneous detection probability is not lowered, then the base station 1 judges a line failure 104 and thus issues an alarm via the backbone line to the central control station. In other words, such an erroneous detection caused by temporary communication quality deteriorations such as variations in space propagation losses may be avoided by increasing the threshold value of the interference detecting means. However, even when the threshold value is increased up to the upper limit value, in the case that the erroneous detection probability is not lowered, an occurrence of either malfunction or failure may be predicted. As a result, the base station 1 issues an alarm.

EMBODIMENT MODE 9

Figure 10:
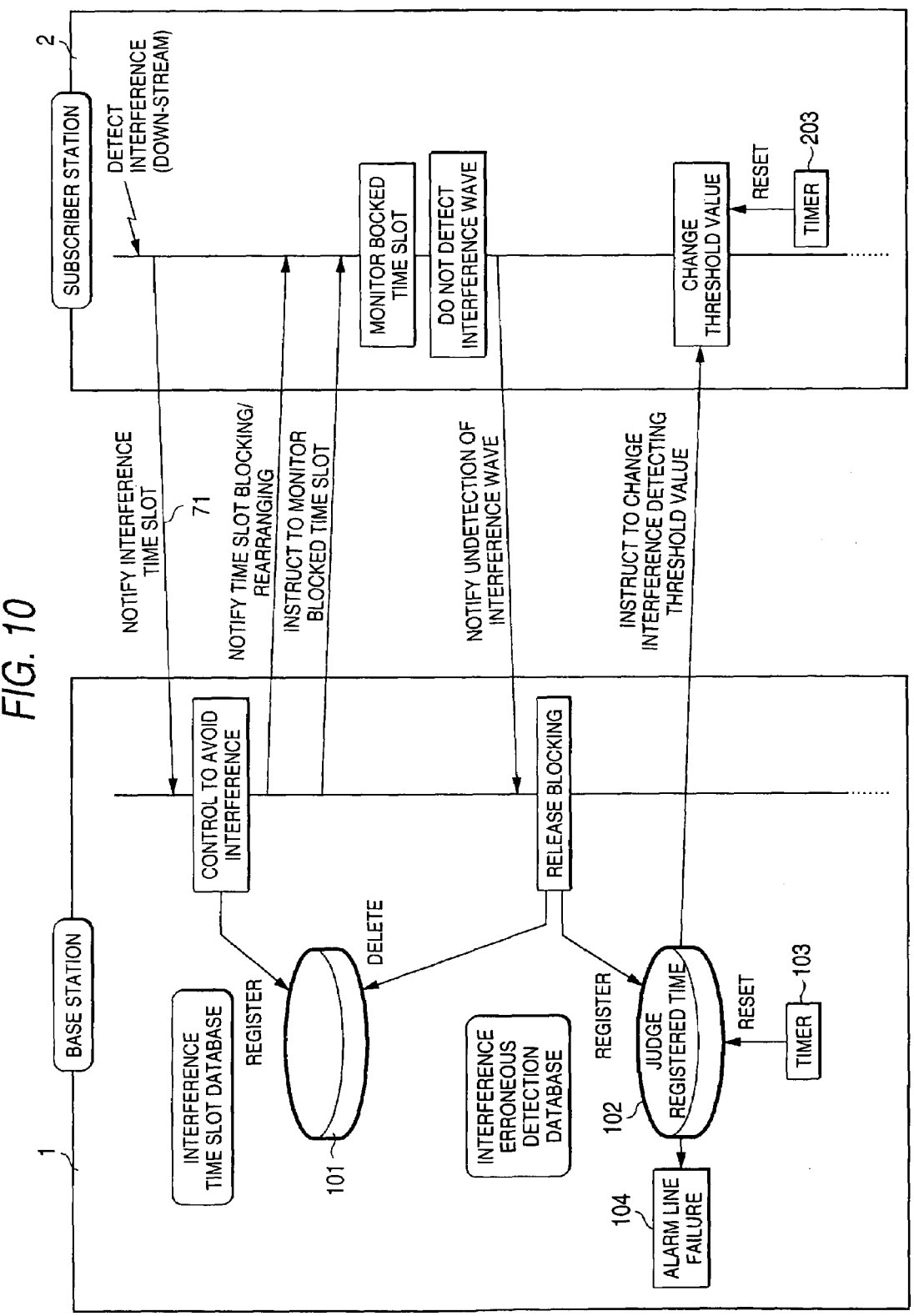
FIG. 10 is a diagram showing a TDMA wireless communication system according to an embodiment mode 9 of the present invention.

FIG. 10 is a diagram showing an embodiment mode 9 according to the present invention.

In this figure, the base station 1 contains an interference time slot database 101 and an interference erroneous detection database 102. The base station 1 registers interference time slot information into the interference time slot database 101. This interference time slot information is detected by the subscriber station 2 within the service area of the own base station 1, and is notified via the up-stream line 71. When the base station 1 reallocates and rearranges the time slots with respect to the respective lines, this base station excludes the relevant interference time slot from the time slots to be allocated and blocks the excluded interference time slot.

The base station 1 causes the subscriber station 2 to monitor such a time slot that this subscriber station 2 detects the interference and blocks the interference time slot for a predetermined time period so as to detect as to whether or not an interference wave is present. In the case that either the interference wave cannot be detected or the interference wave which has been once detected disappears later, the subscriber station 2 notifies such a fact that the interference wave cannot be detected to the base station 1. Upon receipt of this notification, the base station 1 deletes the information of this relevant time slot from the interference time slot database 101 so as to release blocking of this time slot. At the same time, the base station 1 registers the information of this time slot into the interference erroneous detection database 102.

The information saved in the interference erroneous detection database 102 of the base station 1 is used to judge the erroneous detection time and then is reset every time a time period managed by a timer 103 has passed. In such a case that the base station 1 judges that the erroneous detection time of the subscriber station 2 exceeds a reference value, this base station 1 instructs the subscriber station 2 to increase a threshold value of an interference detecting means provided in the own subscriber station. Even when the threshold value of the subscriber station 2 is increased up to an upper limit value, if the erroneous detection probability is not lowered, then the base station 1 judges a line failure 104 and thus issues an alarm via the backbone line to the central control station.

Alternatively, when the subscriber station 2 is required to change the threshold value by the base station 1, the subscriber station 2 is operated to change this threshold value. At the same time, this subscriber station 2 may actuate the own timer 203, and may control such that the threshold value is returned to the original value after predetermined time has elapsed. As a result, the base station 1 is no longer required to manage the interference detection threshold values of all of the subscriber stations, so that the processing work load given to the base station 1 can be reduced.

EMBODIMENT MODE 10

Figure 11:
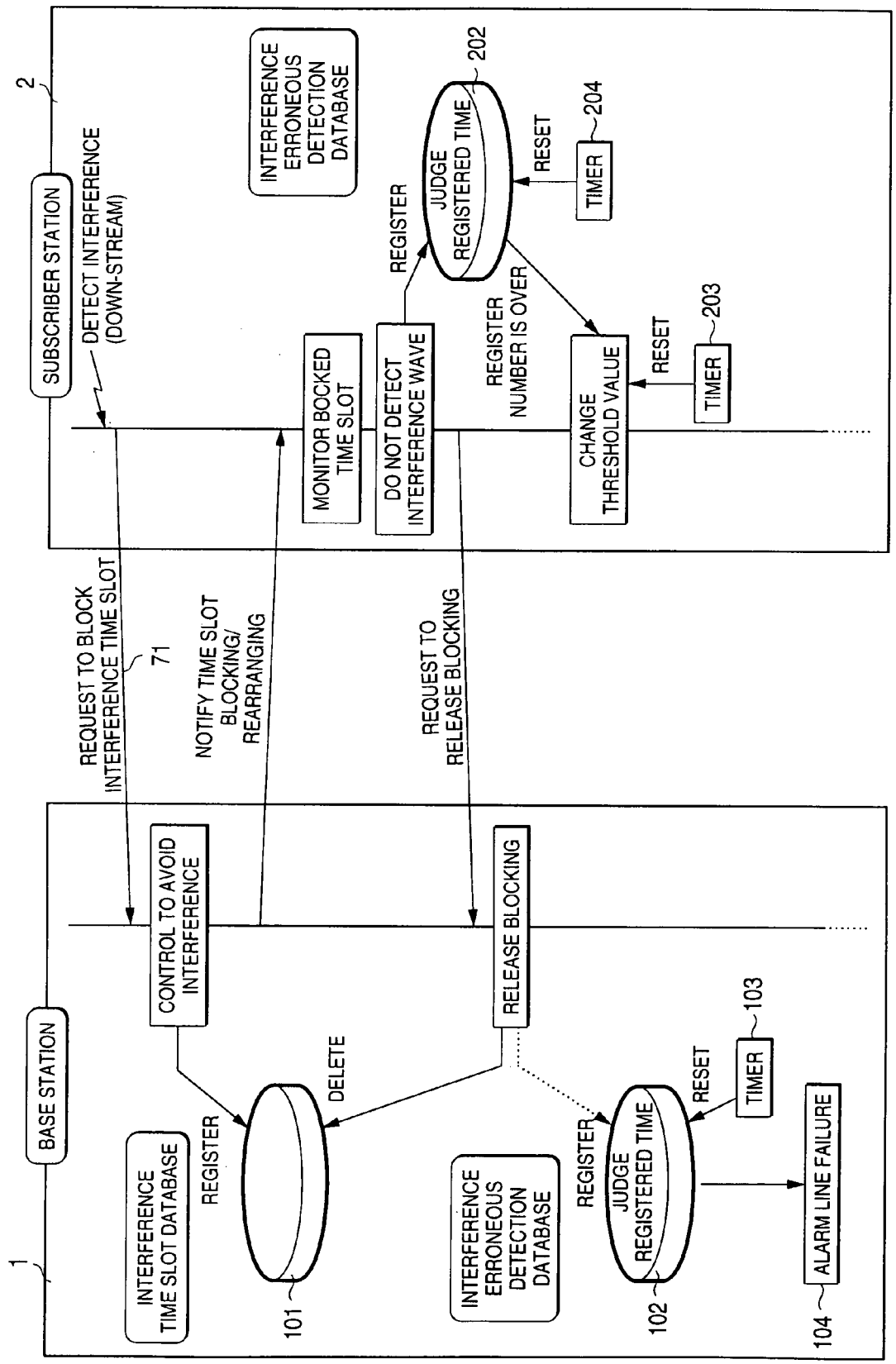
FIG. 11 is a diagram showing a TDMA wireless communication system according to an embodiment mode 10 of the present invention.

FIG. 11 is a diagram showing an embodiment mode 10 according to the present invention.

In this figure, the base station 1 contains an interference time slot database 101 and an interference erroneous detection database 102. The base station 1 registers interference time slot information into the interference time slot database 101. This interference time slot information is detected by the subscriber station 2 within the service area of the own base station 1 and is notified via the up-stream line 71. When the base station 1 reallocates and rearranges the time slots with respect to the respective lines, this base station excludes the relevant interference time slot from the time slots to be allocated and blocks the excluded interference time slot.

The subscriber station 2 monitors such a time slot which is blocked by the base station 1 in response to the notification of the own subscriber station 2 for a predetermined time period in order to check as to whether or not an interference wave is present. In the case that either the interference wave cannot be detected by the subscriber station 2 or the interference wave which has been once detected disappears later, this subscriber station 2 registers the information of this interference time slot into the interference erroneous detection database 202 of the own subscriber station 2. At the same time, the subscriber station 2 sends a block releasing request of this relevant time slot to the base station 1. Upon receipt of this notification issued by the subscriber station, the base station 1 deletes the information of this relevant time slot from the interference time slot database 101 so as to release blocking of this time slot. At this time, the base station 1 may register the information of this time slot into the interference error detection database 102 of the own base station 1.

The information saved in the interference erroneous detection database 202 of the subscriber station 2 is used to judge the erroneous detection time and then is reset every time a time period managed by a timer 204 has passed. In such a case that the subscriber station 2 judges that the erroneous detection time of the own subscriber station exceeds a reference value, this subscriber station 2 is operated in such a control manner that a threshold value of an interference detecting means provided in the own subscriber station 2 is increased.

At this time, the threshold value of the interference detection may be controlled to be returned to the original value after a preselected time period has passed by way of a timer 203 owned by this subscriber station 2.

What is claimed is:

1. A base station apparatus for communicating with a plurality of subscriber stations on a TDMA wireless communication manner, comprising:

an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database;

wherein when interference is detected in a time slot received from a subscriber station, interference time slot information about said time slot in which interference is detected is registered into said interference time slot database; the time slot reallocation/rearrangement are carried out based upon registered information of said interference time slot database such that said time slot in which interference is detected is reassigned to one or more time slots where no interference has been detected; and also time slot reallocation/rearrangement information is transmitted to the respective subscriber stations, and wherein time slot allocations/arrangements of all respective ones of said plurality of subscriber stations are changed once each super frame of a TDMA frame transmission structure, and wherein said base station transmits to the respective subscriber stations subsequent time slot reallocation/rearrangement information containing new time slot arrangements, over a plurality of frames within a super frame period.

2. A base station apparatus for communicating with a plurality of subscriber stations on a TDMA wireless communication manner, comprising:

an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database;

wherein when interference is detected in a time slot received from a subscriber station, interference time slot information about said time slot in which interference is detected is registered into said interference time slot database; the time slot reallocation/rearrangement are carried out based upon registered information of said interference time slot database such that said time slot in which interference is detected is reassigned to one or more time slots where no interference has been detected; and also time slot reallocation/rearrangement information is transmitted to the respective subscriber stations, and wherein a service area of said base station is subdivided into a plurality of sectors, and wherein said TDMA control unit executes time slot reallocation/rearrangement first to subscriber stations in sectors where no interference has occurred, and then to subscriber stations in sectors where interference has occurred.

3. A TDMA wireless communication system in which a base station wireless-communicates with a plurality of subscriber stations by an up-stream line TDMA system and a down-stream line TDM system;

wherein the base station comprises: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, and also transmits up-stream TDMA time slot reallocation/rearrangement information to the respective subscriber stations every predetermined frame in a down-stream TDM line;

wherein each of said subscriber stations monitors as to whether or not there is the up-stream TDMA time slot reallocation/rearrangement information addressed to the own subscriber station, which is transmitted from said base station every predetermined frame, and when said up-stream TDMA time slot reallocation/rearrangement information cannot be received, said subscriber station judges an occurrence of interference and transmits said occurrence of interference to the base station, and wherein the base station which has received the occurrence of interference registers the interference occurrence information into said interference time slot database, and transmits time slot reallocation/ rearrangement information to the respective subscriber stations based on the registered information saved in the interference time slot database.

4. A base station apparatus for communicating with a plurality of subscriber stations in a TDMA wireless communication manner, comprising:

an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, wherein when interference is detected in a time slot received from a subscriber station, said interference time slot information is registered into said interference time slot database; the time slot reallocation/rearrangement are carried out based upon registered information of said interference time slot database; and also time slot reallocation/rearrangement information is transmitted to the respective subscriber stations, and wherein on the other hand, in the case that said interference time slot is received for a predetermined time period and the interference disappears, the interference time slot information registered into said interference time slot database is deleted therefrom.

5. The base station apparatus as claimed in claim 4, wherein said base station apparatus comprises an interference erroneous detection database, and registers said interference time slot information which has been deleted from said interference time slot database into said interference erroneous detection database.

6. The base station apparatus as claimed in claim 5, wherein when the same interference time slot information whose total number is larger than, or equal to a preselected number is registered into the interference erroneous detection database within a predetermined time period, said base station apparatus transmits an abnormal state to a central station for managing the base station.

7. The base station apparatus as claimed in claim 5, wherein when the same interference time slot information whose total number is larger than, or equal to a preselected number is registered into the interference erroneous detection database within a predetermined time period, said base station apparatus increases an interference judging threshold value used to detect an occurrence of interference.

8. A TDMA wireless communication system in which a base station communicates with a plurality of subscriber stations in a wireless manner, wherein the base station comprises: an interference time slot database for registering/storing thereinto a communication time slot in which interference happens to occur; and a TDMA control unit for executing reallocation/rearrangement of time slots communicating with the respective subscriber stations in response to a change in a traffic based upon the interference time slot information of the interference time slot database, wherein when interference is detected in a time slot received from the base station, said subscriber station transmits interference time slot information to said base station, wherein the base station which has received the interference time slot information registers said interference time slot information into said interference time slot database, performs the time slot reallocation/rearrangement based upon registered information of said interference time slot database, transmits time slot reallocation/rearrangement information to the respective subscriber stations, and on the other hand, transmits an instruction signal to said subscriber station, said instruction signal causing said subscriber station to receive said interference time slot for a predetermined time period, and wherein said subscriber station which has received said instruction signal receives said interference time slot for a predetermined time period, and when the interference disappears, said subscriber station sends a request to said base station, said request requesting a deletion of said interference time slot information registered into said interference time slot data.

9. The TDMA wireless communication system as claimed in claim 8, wherein an interference erroneous detection database is provided on the side of either the base station or the subscriber station, and the interference time slot information deleted from the interference time slot database is registered into said interference erroneous detection database.

10. The TDMA wireless communication system as claimed in claim 9, wherein when the same interference time slot information whose total number is larger than, or equal to a preselected number is registered into the interference erroneous detection database within a predetermined time period, an abnormal state is transmitted to a central station for managing the base station.

11. The TDMA wireless communication system as claimed in claim 9, wherein when the same interference time slot information whose total number is larger than, or equal to a preselected number is registered into the interference erroneous detection database within a predetermined time period, an interference judging threshold value used to detect interference is increased.

* * * * *